United States Patent [19]

Kanno et al.

[11] Patent Number: 4,615,831
[45] Date of Patent: Oct. 7, 1986

[54] FIRE RETARDANT POLYOLEFIN COMPOSITION

[75] Inventors: Fukuo Kanno, Yokohama; Keiichi Nakaya, Chiba, both of Japan

[73] Assignee: Asahi Glass Company, Ltd., Tokyo, Japan

[21] Appl. No.: 673,846

[22] Filed: Nov. 21, 1984

[30] Foreign Application Priority Data

Nov. 22, 1983 [JP] Japan .................... 58-218787

[51] Int. Cl.$^4$ .................... C09K 21/06; C09K 21/10
[52] U.S. Cl. .................... 252/609; 106/18.11; 106/18.21; 106/18.32; 252/601; 428/920; 428/921
[58] Field of Search ........... 252/601, 609; 428/921, 428/920; 106/18.18, 20, 15.05, 18.11, 18.21, 18.32

[56] References Cited

U.S. PATENT DOCUMENTS

| | | | |
|---|---|---|---|
| 4,261,880 | 4/1981 | Fujii et al. | 524/147 |
| 4,396,730 | 8/1983 | Imahashi | 252/609 |
| 4,397,759 | 8/1983 | Hancock | 252/609 |

FOREIGN PATENT DOCUMENTS

47-07469 3/1972 Japan .................... 252/609

*Primary Examiner*—Stephen J. Lechert, Jr.
*Assistant Examiner*—Howard J. Locker
*Attorney, Agent, or Firm*—Oblon, Fisher, Spivak, McClelland & Maier

[57] ABSTRACT

A fire retardant polyolefin composition comprising from 40 to 70% by weight of magnesium hydroxide and from 30 to 60% by weight of a polyolefin, wherein from 0.3 to 10% by weight, based on the magnesium hydroxide, of at least one N-hydroxyalkylamide of a higher fatty acid selected from the group represented by the general formulas:

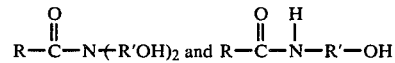

where R is a $C_{11}$–$C_{17}$ alkyl or alkylene group and R' is $C_nH_{2n}$ where n is an integer of 1 to 6, is incorporated.

5 Claims, No Drawings

FIRE RETARDANT POLYOLEFIN COMPOSITION

The present invention relates to a fire retardant polyolefin composition. More particularly, it relates to a fire retardant polyolefin composition wherein a relatively large amount of magnesium hydroxide powder containing a certain specific dispersing agent is incorporated in a polyolefin.

The conventional techniques for the fire retardancy of synthetic resins are, in most cases, based on incorporation of a halogen compound or a combination of a halogen compound with antimony trioxide. These materials are expensive, and yet have a problem that a halogen gas is generated during the molding operation or when burned.

Under the circumstances, there have been made various studies in recent years in an attempt to impart fire retardancy to a synthetic resin by incorporating a water-releasing inorganic filler free from the above-mentioned problem, into the synthetic resin in a high concentration. However, in order to impart adequate fire retardancy solely with such an inorganic filler, it is necessary to incorporate the inorganic filler in a high concentration, whereby there will be problems such that the mechanical strength of the resin tends to be poor, and the flowability in a mold tends to decrease and silver streaks (i.e. flow marks) are likely to form on the surface of a molded product, thus leading to difficulties in the moldability. In order to minimize such difficulties, it has been proposed to incorporate various additives as a fire retardant assistant or as a dispersing agent so as to reduce the amount of the inorganic filler. However, no adequate effectiveness has so far been obtained. The moldability may be improved by using a polyolefin having a low molecular weight. However, the mechanical strength will, then, be low. On the other hand, it is known to incorporate a higher fatty acid or its metal salts to improve the moldability. However, in such a case, the fire retardancy tends to decrease, or no adequate improvement in the moldability will be obtained in the region where the decrease in the fire retardancy is small. Thus, it has been extremely difficult to realize a hazardless molding material having adequate practical moldability while maintaining a high level of fire retardancy.

The present inventors have conducted extensive researches to solve the above-mentioned problems for moldability and to achieve a high level of fire retardancy (equivalent to V-1 or V-0 under U.S. UL-Standards) while maintaining good mechanical properties of the material, and have finally found that a satisfactory result can be obtained by using a certain specific dispersing agent in combination with magnesium hydroxide. The present invention has been accomplished based on this discovery.

Namely, the present invention provides a fire retardant polyolefin composition comprising from 40 to 70% by weight of magnesium hydroxide and from 30 to 60% by weight of a polyolefin, wherein from 0.3 to 10% by weight, based on the magnesium hydroxide, of at least one N-hydroxyalkylamide of a higher fatty acid selected from the group represented by the general formulas:

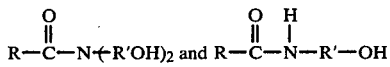

where R is a $C_{11}$–$C_{17}$ alkyl or alkylene group and R' is $C_nH_{2n}$ where n is an integer of 1 to 6, is incorporated.

Now, the present invention will be described in detail with reference to the preferred embodiments.

In the present invention, the polyolefin includes a high-density polyethylene, a medium- or low-density polyethylene, a polypropylene, an ethylene-propylene copolymer, a polybutene, and a poly-4-methylpenetene-1. Such a polyolefin may be copolymerized with a small amount of a vinyl monomer, or may be blended with an elastomer or a blend polymer modifier.

The magnesium hydroxide in the present invention is preferably fine powder having an average particle size of from 0.1 to 20 μm, more preferably from 0.2 to 10 μm. If the average particle size of the magnesium hydroxide is too fine, the moldability tends to deteriorate although the fire retardancy will be improved. On the other hand, if the average particle size of the magnesium hydroxide is too large, the fire retardancy tends to decrease.

A filler such as calcium carbonate, talc, clay, aluminum hydroxide, glass fiber or silica, may be mixed within a range where the fire retardancy will not be impaired.

In the present invention, the proportions of the polyolefin and the magnesium hydroxide are within ranges of from 30 to 60% by weight of the polyolefin and from 40 to 70% by weight of magnesium hydroxide, preferably within ranges of from 35 to 50% by weight of the polyolefin and from 50 to 65% by weight of magnesium hydroxide. If the proportion of magnesium hydroxide is less than the above range, the fire retardancy tends to be low, whereby the requirement for a high degree of fire retardancy can not be met. On the other hand, if the proportion of magnesium hydroxide exceeds the above range, the mechanical strength and the moldability tend to be poor.

The N-hydroxyalkylamide of a higher fatty acid in the present invention, is effective for the improvement in the molding flowability, the outer appearance of a molded product, the fire retardancy and the mechanical properties. It is believed that by virtue of the acidamide structure, the N-hydroxyalkylamide is readily adsorbed on the surface of the magnesium hydroxide and thus is effective as a dispersing agent, whereby it gives favorable effects to the molding flowability, the outer appearance of a molded product and the mechanical properties. Further, it is believed that the N-hydroxyalkylamide captures radicals generated during the heat-melting operation or during the combustion, and thus is effective for the improvement of the outer appearance of a molded product or the fire retardancy.

The N-hydroxyalkylamides of higher fatty acids in the present invention, are represented by the general formulas:

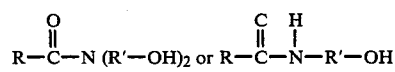

where R is a $C_{11}$–$C_{17}$ alkyl or alkylene group, and R' is $C_nH_{2n}$ where n is an integer of 1 to 6. These N-hydroxyalkylamides of higher fatty acids may be used alone or in combination as a mixture.

The amount of the N-hydroxyalkylamide of a higher fatty acid is within a range of from 0.3 to 10% by weight, preferably from 0.5 to 5% by weight, based on the magnesium hydroxide. If the amount is less than the above range, no adequate fire retardancy can be expected. On the other hand, if the amount exceeds the above range, the mechanical strength tends to be poor.

In the present invention, any one of the following blending methods may be employed for the incorporation of the N-hydroxyalkylamide of a higher fatty acid: a dry method wherein the N-hydroxyalkylamide is firstly pulverized to fine powder and then added to the magnesium hydroxide in a predetermined amount, and the mixture is dry blended by means of a tumbler blender, a V-blender, a Henschel mixer, a ribbon mixer, etc.; a semi-dry method wherein the N-hydroxyalkylamide is first diluted with isopropyl alcohol, ethyl alcohol or a diethylene glycol monoester solvent, and then dry blended with the magnesium hydroxide; and a wet method wherein magnesium hydroxide is dipped in the diluted solution.

According to the present invention, it is possible to achieve an excellent balance of the molding flowability, the outer appearance of a molded product, the mechanical properties and the fire retardancy within the above-mentioned ranges for the proportions of the respective components.

However, the composition of the present invention may contain, in addition to the above-mentioned components, additional additives such as a heat stabilizer, an ultraviolet absorber, a plasticizer, a lubricant, an antistatic agent, a pigment such as carbon black, a foaming agent, a thickener, a dispersing agent or a nuclear agent. Further, a halogen-type fire retardant may also be combined in a small amount to the extent that no problem will be thereby brought about. Furthermore, in order to improve the fire retardancy, it is possible to incorporate a phosphoric acid ester or a phosphoric acid compound, or to incorporate a radical capturing agent or a peroxide.

The resin composition of the present invention may be prepared by a conventional kneading method by means of a roll mixer, a Bunbury's mixer, a kneader, a single axis extruder or a twin axis extruder.

Now, the present invention will be described in further detail with reference to Examples and Comparative Examples. However, it should be understood that the present invention is by no means restricted by these specific Examples.

In the test results shown in the Examples and Comparative Examples, the molding flowability is represented by flow rates (F.R.) in accordance with ASTMD 1238; the outer appearance of a molded product was evaluated by the observation of a test piece of 70 mm×70 mm×2 mm; and the mechanical strength was evaluated by Izod impact strength. The tests for fire retardancy were conducted in accordance with U.S. UL-Standard, Subject 94. The average self-extinguishing time is an average of a total of 20 test results, i.e. a total of ten combustion test pieces were tested twice for the self-extinguishing time after catching fire. The maximum self-extinguishing time is the maximum value among the 20 test results.

EXAMPLE 1

1800 g of magnesium hydroxide having an average particle size of 7 μm (manufactured by Asahi Glass Company Ltd.) and 30 g of stearyl diethanolamide (manufactured by Toho Chemical Co., Ltd.) were thoroughly mixed in a Henschel mixer. The mixture thereby obtained and 1200 g of polypropylene (Noblen BC-4, manufactured by Mitsubishi Petrochemical Co., Ltd.) were introduced in a V-mixer and stirred for 3 minutes. Then, the mixture was fed into a reverse rotating twin-axis extruder (manufactured by Nakatani Kikai K.K.) set at a cylinder temperature of 220° C. and screw rotational speed of 70 rpm, and thereby kneaded and pelletized. The pellets thereby obtained were dried at 130° C. for at least 3 hours, and then injection-molded by means of a 3 ounce injection molding machine (manufactured by the Japan Steel Works Co., Ltd.) set at a cylinder temperature of 220° C. and an injection pressure of 800 kg/cm$^2$ (as the resin pressure) to obtain test pieces. The test pieces were evaluated. The results are shown in Table 1.

EXAMPLES 2 to 4

1800 g of the same magnesium hydroxide as used in Example 1 and 30 g of a dispersing agent as identified in Table 1 were introduced into a Henschel mixer and stirred for 2 minutes. Then, the mixture was transferred to a V-mixer, and after an addition of 1200 g of polypropylene (Noblen BC-4, manufactured by Mitsubishi Petrochemical Co., Ltd.), the mixture was stirred for 3 minutes in the V-mixer. Then, the mixture was kneaded, molded and evaluated in the same manner as in Example 1. The results are shown in Table 1.

COMPARATIVE EXAMPLES 1 to 4

1800 g of the same magnesium hydroxide as used in Example 1 and 30 g of a dispersing agent as identified in Table 1 were introduced into a Henschel mixer, and stirred for 3 minutes. Then, the mixture was treated in the same manner as in Example 1. The results are shown in Table 1.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Composition (weight ratio) | | | | | | | | |
| Polypropylene | 39 | 39 | 39 | 39 | 39 | 39 | 39 | 39 |
| Magnesium hydroxide | 60 | 60 | 60 | 60 | 60 | 60 | 60 | 60 |
| Dispersing agent | Stearyl diethanolamide 1.0 | Stearyl monoethanolamide 1.0 | Lauryl diethanolamide 1.0 | Oleyl monoethanolamide 1.0 | Stearic acid 1.0 | Aluminum distearate 1.0 | Glycerin monostearyl ester 1.0 | Lauric acid glycidyl ether 1.0 |
| Test results Combustion test: | | | | | | | | |
| Self-extinguishing time (sec) | 5 | 4 | 7 | 6 | >30 | >30 | 15 | >30 |
| Maximum self- | 12 | 10 | 13 | 14 | >30 | >30 | 25 | >30 |

TABLE 1-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| extinguishing time (sec) |  |  |  |  |  |  |  |  |
| Outer-appearance of a molded product | good | good | good | good | bad | bad | bad | bad |
| F.R. (g/10 min.) | 4.8 | 4.5 | 4.5 | 3.9 | 4.0 | 2.1 | 3.5 | 4.0 |
| Izod impact strength with a notch (kg · cm/cm) | 5.3 | 4.9 | 5.0 | 4.7 | 4.2 | 4.0 | 4.2 | 4.5 |

EXAMPLE 5 and COMPARATIVE EXAMPLE 5

Stearyl diethanolamide was dissolved in ethanol, and the predetermined amount as identified in Table 2 was incorporated to magnesium hydroxide. Then, the mixture was dispersed by means of a Henschel mixer, and then dried at 120° C. for 16 hours. The dried product was blended with polypropylene, and the mixture was kneaded, molded and then evaluated. The results are shown in Table 2.

EXAMPLE 6 and COMPARATIVE EXAMPLE 6

A predetermined amount of stearyl diethanolamide powder as identified in Table 2 was incorporated into magnesium hydroxide. Then, the mixture was dispersed by means of a Henschel mixer, and blended with polypropylene. The mixture was kneaded, molded and then evaluated. The results are shown in Table 2.

TABLE 2

|  | Example 5 | Example 6 | Comparative Example 5 | Comparative Example 6 |
|---|---|---|---|---|
| Composition (weight ratio) |  |  |  |  |
| Polypropylene | 39.7 | 34 | 39.9 | 30 |
| Magnesium hydroxide | 60.0 | 60.0 | 60.0 | 60.0 |
| Dispersing agent | Stearyl diethanolamide | Stearyl diethanolamide | Stearyl diethanolamide | Stearyl diethanolamide |
|  | 0.3 | 6.0 | 0.1 | 10.0 |
| Test results |  |  |  |  |
| Combustion test: |  |  |  |  |
| Self-extinguishing time (sec) | 8 | 5 | >30 | 25 |
| Maximum self-extinguishing time (sec) | 10 | 7 | >30 | 30 |
| Outer-appearance of a molded product | good | good | bad | good |
| F.R. (g/10 min.) | 3.5 | 3.0 | 2.5 | 5.2 |
| Izod impact strength with a notch (kg · cm/cm) | 5.1 | 4.1 | 3.5 | 2.9 |

We claim:

1. A fire retardant polyolefin composition comprising from 40 to 70% by weight of magnesium hydroxide and from 30 to 60% by weight of a polyolefin, wherein from 0.3 to 10% by weight, based on the magnesium hydroxide, of at least one N-hydroxyalkylamide of a higher fatty acid selected from the group represented by the general formulas:

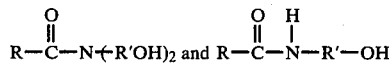

where R is a $C_{11}$–$C_{17}$ alkyl or alkylene group and R' is $C_nH_{2n}$ where n is an integer of 1 to 6, is incorporated.

2. The fire retardant polyolefin composition according to claim 1, wherein the N-hydroxyalkylamide of a higher fatty acid is stearyl diethanolamide or stearyl mono- ethanolamide.

3. The fire retardant polyolefin composition according to claim 1, wherein the polyolefin is a high-density polyethylene, a medium- or low-density polyethylene, a polypropylene, an ethylene-propylene copolymer, a polybutene or a poly-4-methylpentene-1.

4. The fire retardant polyolefin composition according to claim 1, wherein the magnesium hydroxide is fine powder having an average particle size of from 0.1 to 20 μm.

5. The fire retardant polyolefin composition according to claim 1, wherein the magnesium hydroxide is from 50 to 65% by weight, and the polyolefin is from 35 to 50% by weight.